Sept. 18, 1956  R. E. SNYDER  2,763,280
PRESSURE REGULATING SYSTEM
Filed Sept. 12, 1950  2 Sheets-Sheet 1

INVENTOR.
ROBERT E. SNYDER.
BY
ATTORNEYS.

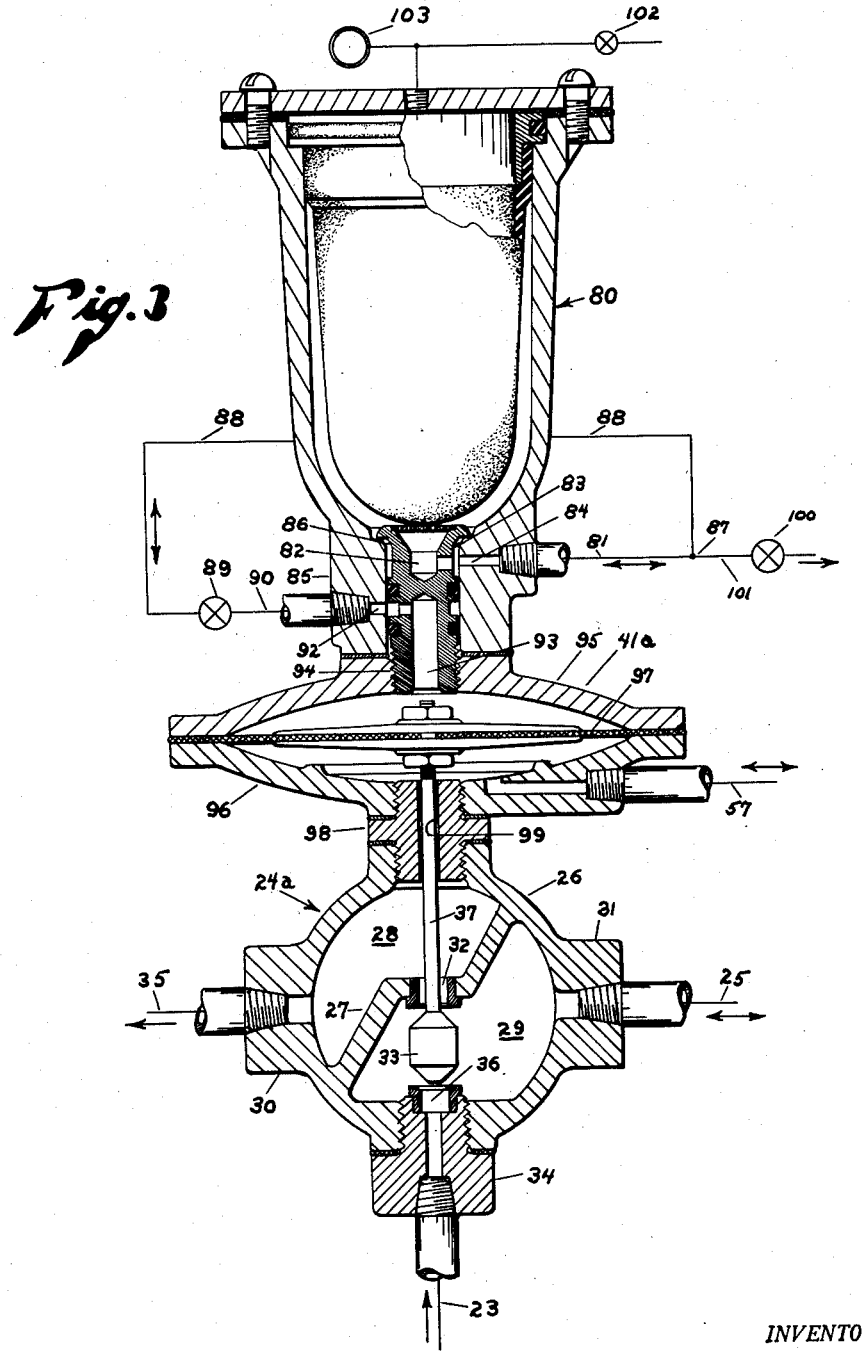

United States Patent Office 2,763,280
Patented Sept. 18, 1956

2,763,280

PRESSURE REGULATING SYSTEM

Robert E. Snyder, Pasadena, Calif.

Application September 12, 1950, Serial No. 184,440

7 Claims. (Cl. 137—207)

This invention relates to pressure regulating systems, and has particular reference to an apparatus and a system for regulating the flow of fluid in a hydraulic distribution system in such wise as to maintain at a substantially constant value a predetermined pressure in the distribution system.

Pressure regulating valves and control systems are used to maintain a relatively low pressure of constant value in one part of a hydraulic system supplied with fluid from another part of the system in which an appreciably higher pressure obtains, it being the function of the regulating apparatus to lower the pressure and maintain it at a constant value despite changes in pressure in the high pressure part of the system and despite variations in the amount of fluid flowing into or required by the low pressure part of the system.

In hydraulic distribution systems such as are used in domestic water supply systems, it is common practice to operate the mains at pressures of about 300 pounds per square inch or more, whereas the maximum pressure to be supplied to consumers is usually less than 100 pounds per square inch, and more often of the order of magnitude of 50 or 60 pounds per square inch.

This pressure reduction is accomplished by supplying a large consumer or a group of small consumers through a secondary distribution system which is connected to the mains through a pressure regulating valve. For such pressure regulating service, it is the common practice to use a fluid actuated valve, the pressure-responsive or motor element of which is connected to be responsive to the pressure on the downstream side of the valve.

In systems of the character mentioned, considerable difficulty is encountered in that the regulating systems do not maintain the low pressure within the desired narrow limits. The deviations of pressure on the downstream side of the valve result primarily from changing consumer demand, but are followed by continued pressure deviations due to "hunting" of the fluid actuated main valve. In pressure regulating systems, as in other regulating systems, the system pressure must change before the fluid actuated valve can operate in such direction as to correct for the change. Thus a change of pressure in one direction initiates the operation of the valve, but the valve does not start instantly. Instead, because a certain amount of friction is inherent in nearly all forms of motor-operated valves, a pressure change well outside of the permissible limits is required to overcome the initial static friction of the moving parts and start the valve moving in a direction to correct for the pressure change. Furthermore, the valve, once moving, tends to overtravel because of the inertia of both the fluid and the valve parts which, when moving rapidly, tend to overshoot the required limits of their travel.

Because of the overtravel of the valve, the pressure change reverses so as to tend to return the valve toward the required position. Again, friction forces and inertia have their effect, the valve being slow in starting to move in the correcting direction and again overshooting the required position. As a result the valve "hunts" and does not reach a steady state operating condition in less than three or four cycles such as have been described, and may take a much longer time.

The friction and inertia effects just mentioned aggravate each other, with the result that most pressure regulating systems do not adequately maintain the desired uniformity of pressure in the secondary distribution system when the consumer demand is subject to rapid and frequent change. Furthermore, the friction effect, tending to cause the valve to stick, may result in the valve regulating at a new pressure outside of the desired operating limits. Also, under certain circumstances the over-traveling of the valve may produce harmonic pulsations of the valve itself with corresponding pressure variations which become self-sustaining due to elasticity in the distribution system. The pressure variations which result from hunting and harmonic pulsation are dangerous to the hydraulic system and cause undue wear of the regulating valve.

With pressure regulating valves of the character mentioned, and in an attempt to minimize hunting, the speed of response of the valve is usually adjusted by means of orifice valves to be slower than would be ideally desirable. This expedient is not a satisfactory solution to the problem, because it not only reduces the speed of response but also decreases the sensitivity. Hunting is not entirely eliminated and the expedient does not completely protect against the establishment of self-sustaining oscillations in the system. The reduced speed of response and decreased sensitivity permits relatively large fluctuations in pressure on the downstream side of the valve as a result of the changing demands on the system. Finally, the difference between the maximum and minimum demands on the system is usually so extreme that no single setting of the orifice valve can possibly meet the requirements of such diverse operating conditions.

In my copending application, Serial No. 113,616, filed September 1, 1949, and entitled Fluid Operated Valve Controls, I have shown how the performance of a pressure regulating system may be improved through the use of a hydropneumatic control device of unique construction. While the control systems disclosed in that application provide satisfactory operation in most cases, certain critically sensitive hydraulic systems are not completely stabilized, although their operation is usually improved.

The present invention is directed to a control system for use with pressure regulating valves of the character hereinbefore mentioned which is an improvement over the control systems shown in said copending application, being so constructed and arranged as to obviate or greatly minimize the disadvantageous characteristics of conventional pressure regulating systems. The system of the present invention includes a compensating or anticipating means operating on the motor element of the pressure regulating valve in such a way as to anticipate and compensate for the natural tendency of the valve to overtravel and hunt in its adjustment to new flow conditions.

Such an anticipating means as is disclosed herein responds to a change in pressure conditions in such a way as, in effect, to evaluate continuously the magnitude and direction of the pressure changes required to be applied to the motor element of the pressure regulating valve, and as a result thereof applies to said motor element compensating pressure changes which start to arrest movement of the main valve before the required regulating position is reached.

It is therefore an object of this invention to provide a control system for so controlling the operation of fluid actuated regulating valves in hydraulic systems as to prevent hunting and provide improved regulation by applying to the motor element of the valve anticipatory compensating pressure changes tending to offset the dynamic conditions normally responsible for the hunting of the regulating valve.

It is also an object of this invention to provide a control system of the character set forth in the preceding paragraph which includes a pressure-responsive control element operable in response to deviations from a desired pressure on the downstream side of the regulating valve for applying to the motor element of said valve a pressure change of the sense required to reestablish the desired downstream pressure, and which includes an anticipatory compensating means operable in response to operation of said control element for applying to said control element a compensating pressure tending to oppose operation thereof.

It is another object of this invention to provide a control system of the character set forth in the preceding paragraphs which includes a pilot valve for controlling the application of fluid pressure to the motor element of the regulating valve, said pilot valve being controlled by a pressure-responsive element connected by a pilot line to respond to pressure changes on the downstream side of the regulating valve, and which includes a negative feedback hydraulic circuit for applying to said pressure-responsive element a compensating pressure upon operation of said pilot valve.

It is a still further object of this invention to provide a control system of the character set forth hereinbefore in which a hydro-pneumatic accumulator is connected to the pilot line to absorb and minimize abrupt pressure changes.

It is also an object of this invention to provide a control system of the character mentioned in the preceding paragraphs wherein the pilot valve is of the three-way type which in one limiting position connects the motor element of the pressure regulating valve to a source of high pressure fluid, and which in another limiting position connects said motor element to a drain line, and in which said pilot valve is of the modulating type movable to intermediate positions interconnecting said high pressure source with both said drain line and said motor element, whereby the pressure applied to said motor element may be varied over wide limits by moving said pilot valve toward one or the other of said limiting positions.

It is a still further object of this invention to provide a control system of the character set forth hereinbefore in which the drain line is connected to the pilot line at an intermediate point so that a portion of the pressure from said drain line is applied directly to said motor element.

It is another object of this invention to provide a control system of the character mentioned in the preceding paragraphs which includes a throttling valve between the pilot valve and the source of high pressure fluid.

Other objects and advantages of this invention will be apparent from a consideration of the following specification, read in connection with the accompanying drawings, wherein:

Fig. 3 is an enlarged sectional view illustrating in detail the construction of the pilot valve portion of the apparatus which is shown on a reduced scale in Fig. 2.

Figure 1:
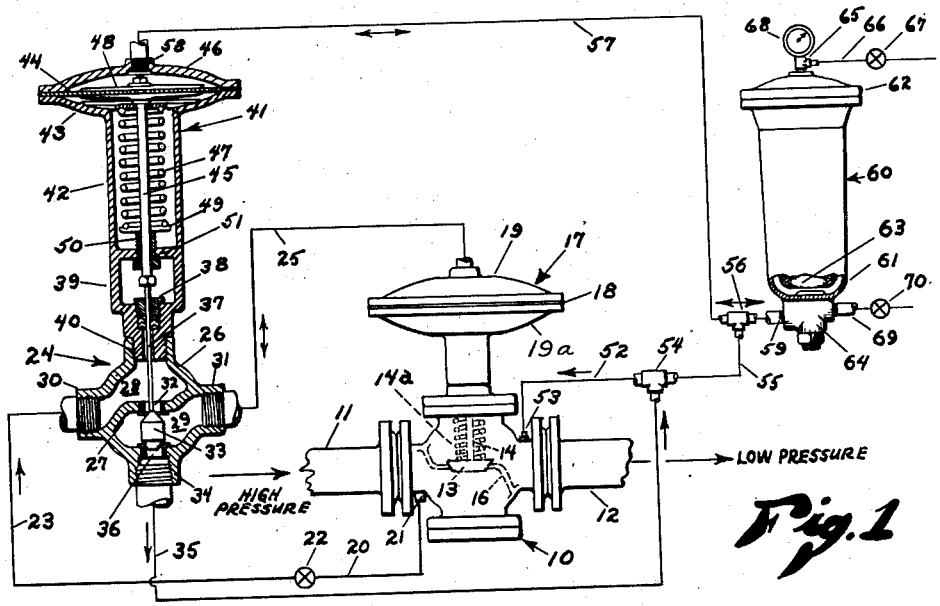
Fig. 1 is a schematic drawing illustrating one form the control system of this invention may take, the pressure regulating valve and the apparatus employed in the control system being illustrated individually and partly in section, with the piping interconnecting the various instrumentalities being shown schematically as single lines.

Referring to the drawings, there is illustrated in Fig. 1 a pressure regulating system embodying the control system of this invention. The regulating system includes a regulating valve indicated generally by the reference character 10 and connected as by means of a conduit 11 to the mains of a fluid distribution system, such as a municipal water supply system. It will be understood that the conduit 11 comprises the high pressure conduit in which the fluid pressure may be as large as several hundred pounds per square inch.

The downstream side of the valve 10 is connected to a conduit 12 which comprises the feeder for the secondary or low pressure distribution system. The low pressure system is ordinarily intended to be operated at a pressure materially less than the supply pressure. In municipal water supply systems, the pressure within the conduit 12 will ordinarily be of the order of magnitude of 50 or 60 pounds per square inch.

As is shown in dotted lines, the valve 10 includes a valve member 13 mounted upon a stem 14 for moving the valve member 13 toward and away from a suitable valve seat formed in an appropriately contoured partition 16 extending across the fluid passage through the body of the valve 10. As will be apparent from an inspection of the drawings, when the valve member 13 occupies the closed position as shown, the secondary conduit 12 will be completely shut off, a spring 14a being used to close the valve when all pressures are balanced. Fluid may be supplied from the conduit 11 to the conduit 12 by raising the valve member 13 from its seat.

The operation of the valve 10 through movement of the valve member 13 is controlled by a fluid motor or actuating device indicated generally by the reference character 17. In the form of valve selected for illustration herein, the motor element 17 may comprise a diaphragm type of actuator including a flexible diaphragm 18 fixed at its edges and attached at its center to the valve stem 14. The diaphragm is enclosed between housing members 19 and 19a so that the valve member 13 may be held in the closed position shown in the drawings by the application of fluid pressure to the upper surface of the diaphragm within the housing part 19. The downward force so transmitted to the valve member 13 exceeds the upward force exerted on the valve member by the high pressure fluid contained within the conduit 11. Opening of the valve 10 is effected, as will be described in more detail hereinafter, by reducing the pressure on the upper surface of the diaphragm 18.

The fluid pressure for holding the valve 10 closed as described is obtained from a power line 20 connected into communication with the conduit 11 so as to receive high pressure fluid therefrom. This connection may conveniently be made by means of a suitable connector 21 secured to or forming a part of the body of the valve 10, and providing means for attaching thereto one end of the power line 20. The power line 20 passes through a throttling or orificing valve 22 (the purpose of which will be described hereinafter), and as indicated at 23, into connection with a pilot valve indicated generally by the reference character 24. The pilot valve 24 is connected as by means of a control line 25 to the upper housing 19 of the motor element 17 so as to apply to the upper surface of the diaphragm 18 the fluid pressure existing in the line 25.

The pilot valve 24 includes a valve body 26 which is partitioned as shown at 27 to divide the interior of the valve body into an upper chamber 28 and a lower chamber 29. Suitable connection means such as an internally threaded boss 30 provides for connecting the line 23 into communication with the upper chamber 28, and a similar structure such as an internally threaded boss 31 provides for connecting the line 25 into communication with the lower chamber 29. Communication between the chambers 28 and 29 is provided by a circular opening in the partition 27 which is fitted with an annular valve seat member 32 adapted to cooperate with the valve member 33 which, in its uppermost position, engages the valve seat 32 and closes off the passageway between the upper and lower chambers 28 and 29.

On the underside of the valve body 26 there is provided a third connection means in the form of an internally threaded boss 34 for connection to a drain line 35. The boss 34 is communicated with the lower chamber 29 through an annular valve seat member 36 axially aligned with the valve seat member 32 and adapted to be engaged by the valve member 33 in its lowermost position.

The valve member 33 is made of quasi-diamond-shaped longitudinal section as defined, for example, by two right circular conical frustums extending in opposite directions from the ends of a cylindrical central portion. A valve member of this shape provides opposed seat engaging surfaces of conical form adapted alternately to be brought into engagement with the upper valve seat 32 or the lower valve seat 36. The spacings between the valve seats and the length of the valve member 33 is made such that when the valve member engages one of the seats, the fluid passage through the other annual seat is opened a substantial amount.

The valve member 33 is adapted to be moved between the two positions just described by means of a valve stem 37 attached to the valve member 33 and extending upwardly through a packing gland 38 carried by a support 39 suitably secured to the valve body 26 as by being threadedly engaged therewith in the manner indicated at 40.

Movement of the valve member 33 between the described positions is controlled by a pressure-responsive element indicated generally at 41 and comprising, in the form illustrated in Fig. 1, a diaphragm type of valve actuator of substantially conventional construction. The pressure-responsive element 41 may include a cylindrical spring housing portion 42 formed integrally with the support 39, the housing 42 being enlarged as shown at 43 to house a flexible diaphragm 44 which is secured at its center to the upper end of an actuating rod 45 which passes downwardly through the housing 42 and is connected to the upper end of the valve stem 37. The upper surface of the diaphragm 44 is covered by a cap 46, and the peripheral edge of the diaphragm 44 is suitably clamped between the mating peripheral edges of the cap 46 and the housing enlargement 43 to provide a fluid seal around the outer edge of the diaphragm.

A compression spring 47 enclosed within the spring housing 42 and surrounding the actuating rod 45 engages the underside of the diaphragm 44 at its upper end through the medium of a spring seat member 48 suitably secured to the upper end of the actuating rod 45. The lower end of the spring 47 bears against a lower spring seat 49 which in turn rests upon the upper end of a tubular adjusting screw 50. The adjusting screw 50 surrounds the actuating rod 45 and is threadedly engaged with a partition 51 extending across the lower end of the spring housing 42. By rotating the adjusting screw 50, the lower spring seat 49 may be raised or lowered to exert a larger or smaller upwardly directed force on the actuating rod 45, thus providing a means for regulating the pressure required to be exerted on the upper surface of the diaphragm 44 in order to move the valve member 33 from its upper position.

The pressure-responsive element 41 is intended to respond primarily to the pressure on the downstream side of the regulating valve 10 within the conduit 12. To this end a pilot line 52 is connected in communication with the interior of the conduit 12 as, for example, by providing a suitable connector 53 on the body of the regulating valve 10 in communication with the downstream cavity of the valve body. The line 52 passes through a T 54, and by means of line 55 through a T 56, and thence by way of line 57 into communication with the space defined between the cap 46 and the diaphragm 44 of the pressure-responsive element 41, such communication being conveniently afforded by means of a threaded boss 58 provided on the cap member 46.

The third branch of the T 54 is connected to the drain line 35, and the third branch of the T 56 is connected as indicated at 59 to a hydro-pneumatic accumulator indicated generally by the reference character 60.

While substantially any form of hydro-pneumatic accumulator 60 may be employed, a preference is expressed for the type illustrated and described in my aforementioned application, Serial No. 113,616. Such an accumulator comprises a housing member 61 fitted with a cap 62. Within the interior space defined by the housing 61 there is positioned a sack-like member 63 formed of flexible resilient material such as rubber, neoprene, or the like. The upper end of this sack-like element is held in sealing engagement with the housing 61 as by having the upper peripheral edge thereof clamped between the housing 61 and the cap member 62.

The line 59 is connected to a fitting 64 provided on the lower portion of the housing 61 and providing a communication between the line 59 and the interior of the housing 61. The cap member 62 is provided with a suitable fitting 65 for connection to a tubing line 66 which is fitted with a shut-off valve 67 and which may be used to pre-charge the space above and within the sack-like member 63 with air or gas under pressure. The intensity of the pre-charge may be indicated by a suitable pressure gauge 68 connected to the fitting 65. A blow-off line 69 may also be connected to the lower fitting 64 and provided with a blow-off valve 70.

Under steady state operating conditions, the pressure within the line 59, and therefore within the interior of the accumulator housing 61, will be the same as the pressure in the conduit 12 on the downstream side of the regulating valve 10. In order to permit the accumulator 60 to accommodate variations in pressure on either side of this normal value, the amount of gas introduced on the upper side of the sack-like member 63 is so selected as to cause that member normally to be partially collapsed. Thus, upon a reduction in pressure on the underside of the sack-like member 63, the same may expand by the expansion of the gas contained thereabove, whereas increases in pressure within the housing 61 may be accommodated by a further collapsing of the sack-like member 63 and a further compression of the gas on the upper side thereof.

In Fig. 1 the moving parts of the various instrumentalities are shown in the positions they occupy during a no-flow condition—that is, under the circumstances where no water is being taken by the secondary or low pressure distribution system. Under these conditions, the regulating valve 10 is closed by reason of the valve member 13 being in its lowermost position engaging the valve seat formed in the partition 16. Full line pressure in the high pressure conduit 11 will be exerted on the underside of the valve 13, whereas the pressure within the low pressure conduit 12 will be the low pressure at which the system is intended to regulate. For the purposes of simplifying the explanation of the operation of the apparatus, let it be assumed that the high pressure applied in the conduit 11 is 100 pounds per square inch, and that the apparatus is regulated to maintain the pressure in the lower pressure conduit 12 at 50 pounds per square inch.

The 50 pound per square inch low pressure is applied through conduits 52, 55, and 57 to the upper side of the diaphragm 44 of the pressure-responsive element 41. This pressure is sufficient to overcome the upwardly directed force of the spring 47 and move the valve member 31 to its lowermost position, engaging the seat 36 and closing off the communication between the drain line 35 and the lower valve chamber 29. At the same time, a communication is opened between the upper chamber 28 and the lower chamber 29 through the annular valve seat 32. High pressure of the order of 100 pounds per square inch applied through lines 20 and 23 (it being understood that the valve 22 is opened) to the upper valve chamber 28 is thus communicated through the lower valve chamber 29 and applied through the line 25 to the motor element 17. The valve member 13 is thus held against its seat in opposition to the 50 pounds per square inch differential pressure tending to lift the valve from its seat.

In order to follow the sequence of operations performed by the various instrumentalities in regulating the pressure within the conduit 12, it will be assumed that a valve is opened somewhere in the low pressure distribution system so as to start drawing water from that secondary system. In order to better understand the mode of operation of the control system illustrated in Fig. 1, reference will first be had to the operation of a conventional pressure regulating system. One form of such a system, it will be understood, utilizes merely the pressure regulating valve 10 with the pilot line 52 connected directly to the motor element 17 at the point where the line 25 is connected to that element in Fig. 1.

In such a system, the drop in pressure resulting from the opening of the valve in the secondary system produces a corresponding drop in pressure on the motor element 17, this reduction in pressure, together with the increase in differential pressure across the valve seat 13, causes the valve 13 to lift from its seat, allowing fluid to flow from the high pressure line to the low pressure line in an attempt to restore the pressure conditions. The start of flow of fluid through the valve 10 will cause the pressure in the low pressure conduit 12 to rise, and will increase the pressure applied to the motor element 17.

It will be appreciated, however, that it is not possible to apply to the motor element 17 a pressure sufficient to stop the upward movement of the valve member 13 until the pressure in the conduit 12 rises nearly to the desired assumed value of 50 pounds. When this condition finally obtains, it is not possible to instantly stop the upward movement of the valve member 13, with the result that the valve opens wider than is required to establish a pressure of 50 pounds per square inch within the conduit 12, so that the pressure therein rises somewhat above the desired value.

This abnormal increase in pressure in the line 12 applies to the motor element 17 a pressure greater than that required to hold the valve member 13 in its proper position, with the result that the valve member 13 starts to move closer to its seat. Again, the forces tending to produce movement of the valve do not balance until the pressure in the conduit 12 nearly reaches the intended regulated value of 50 pounds, and since the valve member 13 cannot be stopped instantly, it again overtravels, this time in the closing direction so that the pressure in the line 12 is reduced to a value lower than is desired. This "hunting" of the valve will continue for some time.

In most instances the amplitude of movement of the valve member 13 gradually reduces until the valve stabilizes at a position which will produce in the low pressure conduit 12 a pressure of substantially the desired value. In some cases, due to elasticity in the system, or due to changing demand conditions, the hunting of the valve will continue indefinitely, and in some cases the amplitude of the oscillations will increase until the pressure swings reach dangerous values.

The difficulties attendant upon the operation of such a system are obviated with the control system which is illustrated in Fig. 1, as may be seen from the following explanation of its mode of operation. When water is taken from the conduit 12 with the valve 13 in its closed position, the resulting pressure drop in the conduit 12 is transmitted through the lines 52, 55, and 57 to reduce the pressure on the upper side of the diaphragm 44 of the pressure-responsive element 41. This allows the spring 47 to lift the valve 33 from the lower seat 36, interconnecting the line 25 with the drain line 35. The pressure applied to the motor element 17 thus drops immediately, and the valve 13 of the pressure regulator 10 starts its opening movement.

It will be seen, however, that when the valve member 33 is lifted from the seat 36, high pressure fluid flowing through the lines 20 and 23 into the upper chamber 28 is permitted to flow through the upper valve passage 32 into the lower chamber 29 and through the lower annular valve seat 36 and outwardly through the drain line 35. This produces in the drain line 35 a pressure which is somewhat less than the 100 pounds per square inch applied to the supply line 20, the reduction in pressure resulting from the throttling in the region of the valve seats 32 and 36. Since the drain line 35 is connected to the downstream side of the regulating valve 10 through the T 54 and line 52, and since the line 52 has an inherent resistance tending to oppose the flow of fluid therethrough, it will be seen that the pressure at the T 54 is somewhat higher than the pressure in the low pressure conduit 12.

The increase in pressure at the T 54 is applied through lines 55 and 57 to the pressure-responsive element 41 of the pilot valve 24, and the rise in pressure produced by the pressure drop in the line 52 occurs instantly upon the opening of the pilot valve 24 as described. Thus, there is applied to the pressure-responsive element 41 a compensating pressure change tending to offset the initial condition which resulted in the opening of that valve.

It is important to note that this compensating pressure is applied to the pressure-responsive element 41 just after the original actuating pressure change is applied to the motor element 17. The compensating pressure change applied to the pressure-responsive element 41 tends to arrest the upward movement of the valve member 33 and probably causes it to move downwardly to a point somewhat closer to its lower seat 36, causing a corresponding increase in pressure applied to the motor element 17. It is also important to note that this change in pressure applied to the motor element 17 occurs before the valve member 13 reaches a position which would produce in the conduit 12 the desired regulated pressure of 50 pounds per square inch. The connection from the drain line 35 to the pressure-responsive element 41 through the pilot line portions 55 and 57 thus constitutes a negative feedback circuit producing on the pressure-responsive element 41 a compensating pressure change tending to compensate and to a limited degree nullify the effect of the initial change in conditions which initiated operation of the pilot valve 24.

The effectiveness of this compensation is further enhanced by the fact that the movement of the valve member 33 closer to the lower seat 36, as just described, not only increases the pressure applied to the motor element 17, but reduces the pressure in the drain line 35. This pressure reduction is applied to the pressure-responsive element 41 in opposition to the immediately preceding pressure change which caused the described downward movement of the valve member 33.

Upon the pressure changes applied to the pressure-responsive element 41 as described is superimposed the more slowly rising pressure of the line 12 resulting from the gradual opening of the main valve. This steadily lowers the effective operating position of the pilot valve member 33 so as to gradually bring the pressure applied to the motor element 17 to the final value required to hold the main valve in its required regulating position. Overtraveling is thus prevented, and hunting is eliminated.

It will be seen that the anticipatory action of the negative feedback circuit is such as to provide a continuous evaluation of the magnitude and direction of the pressure changes which must be applied to the motor element 17 in order to move the main valve 13 to its new regulating position. By this means, very large forces are first applied; but these forces are rapidly reduced as the main valve approaches the new regulating position, reducing to zero at the time such position is reached. Friction forces are overcome by the large operating forces produced, and inertia effects are eliminated by the reduction in operating forces in such a way as to slow the travel of the main valve before the regulating position is reached.

Similar results obtain when the flow changes from one finite value to another. Let it be assumed that with a conventional pressure regulating system such as previously mentioned, a given amount of water is being taken from the low pressure distribution system, and that the valve member 13 is in such a position as to produce in the low pressure line the desired regulated pressure of 50 pounds per square inch. Under these assumed conditions, let it be assumed that the flow is reduced by the closing of one or more valves connected to the low pressure distribution system. In the conventional system the resulting change in pressure on the downstream side of the regulator 10 is applied directly to the motor element 17. If this change is not of sufficient magnitude to overcome the resistance to movement of the valve member 13, the valve 13 will remain stationary, and the pressure in the line 12 will stabilize at a new higher value. When the accumulated pressure changes resulting from further reductions in demand aggregate an amount sufficient to overcome the frictional resistance to movement of the valve member 13, the same will start moving in a closing direction as is required to restore the initial pressure conditions. The forces acting on the valve will not balance until the valve member 13 substantially reaches the new position, at which time its inertia carries it beyond that position and causes the pressure to reduce beyond the desired value.

With the control system of this invention, the overshooting of the valve is prevented. When a pressure increase occurs in the low pressure conduit 12 as a result of decreased demand as assumed, that increase in pressure is applied to the pressure-responsive element 41, producing an immediate change in the position of the valve member 33. This changes, in opposite directions, the degree of throttling at the valve seats 32 and 36 so as to produce a correspondingly higher pressure in the lower valve chamber 29. This higher pressure, being applied to the motor element 17 by the line 25, starts the valve member 13 moving in the closing direction so as to compensate for the initial pressure change in the conduit 12. At the same time, the downward movement of the valve 33 reduces the flow in the drain line 35 and so reduces the pressure drop in the pilot line portion 52, causing a corresponding reduction in the pressure applied to the pilot line portions 55, 57, and to the pressure-responsive element 41.

The reduction in pressure applied to the pressure-responsive element 41 is in opposition to the original pressure increase, and so tends to cause the valve member 33 to move in the opposite direction. This reversal of the force applied to the valve member 33 produces a corresponding tendency to reverse the pressure change applied to the motor element 17, and thus starts to slow the movement of the valve member 13 before that member actually reaches the new position required to restore the desired pressure in the downstream conduit 12. This compensating change in pressure anticipates the conditions that will obtain when the valve member 13 reaches the position required to regulate the downstream pressure at the desired value. As previously described, the gradually reducing pressure in the conduit 12 is superimposed on the pressure changes described so as to bring the main valve to a stop at the new regulating position so that overshooting of the pressure regulator 10 is avoided.

It will be appreciated that the pressure-responsive element 41 may be very sensitive in its operation, as is characteristic of elements of that character. In the apparatus shown in Fig. 1, a change in pressure of the order of magnitude of 3 to 5 pounds per square inch will be sufficient to move the valve member 33 the limit of its travel—that is, from full engagement with one of the seats to full engagement with the other seat. The frictional resistance to movement of the valve member 33 (resulting primarily from the packing gland 38) may be made sufficiently low that a pressure change of the order of 1 pound will start the valve member 33 moving to a new position. As a result of the sensitivity of the pressure-responsive element 41, the valve member 33 ordinarily floats between the seats 32 and 36, and relatively small movements of the valve member 33 change the pressure conditions in the lower chamber 29 and so change the position of the valve member 13 by such an amount as may be required to maintain the pressure within the downstream conduit 12 substantially at the desired value. Each change in position of the valve member 33 produces a change in pressure at the T 54 and so applies almost instantly to the pressure-responsive element 41 a compensating change in pressure.

The degree of anticipatory control produced by the negative feedback circuit depends, of course, upon the magnitude of the compensating pressure change applied to the pressure responsive element 41. The magnitude of this change depends upon the amount of fluid flowing in the drain line 35 and the resistance to that flow produced by the drain line 35 and by the pilot line section 52. Adjustment of the degree of negative feedback may be obtained by adjusting the size and length of these line portions. It has been found that the amount of negative feedback required to produce the desired results is not critical, and satisfactory results are obtained if a substantial portion of the entire length of the pilot line 52, 55, 57 is made up of the portion 52—that is, included between the source of control pressure and the T 54.

The orifice valve 22 is provided for the purpose of allowing the amount of fluid flowing in the power line 23 to be adjusted for optimum operation. The effect of throttling the flow at the valve 22 is to limit the amount of water flowing through the pilot valve 24 and in the drain line 35. This in turn controls indirectly the pressure produced in the lower valve chamber 29, and adjusts the normal position of the valve member 33. With the orifice valve 22 opened wide, the valve member 33 must ride very high and very close to its seat 32 in order to prevent the pressure from rising too high in the valve chamber 29. If the orifice valve 22 is throttled to an excessive degree, the flow in the pilot line 35 is materially restricted by reason of the valve member 33 riding very close to its lower seat 36. The optimum orifice valve opening depends on the volumetric displacement of the motor element 17, a large displacement requiring a greater opening than does a smaller displacement.

Generally speaking, satisfactory operation will be obtained if the T 54 is located in the pilot line substantially midway between the pressure-responsive element 41 and the point of connection of the pilot line to the low pressure distribution system. With the piping so arranged, sufficient adjustment is available at the orifice valve 22 to set the apparatus for entirely satisfactory and reliable operation.

Because of the sensitivity of the pressure-responsive element 41, it is desirable to eliminate pressure shocks which may result from abrupt movements of the valve member 33. If, for example, a fast drop in pressure of substantial magnitude occurs in the downstream line 12, the resulting pressure change on the pressure-responsive element 41 may be sufficient to move the valve member 33 to one of its extreme positions. The shock resulting from the engagement of the valve member 33 with one of its seats may produce a shock wave type of pressure change in the drain line 35 which would be passed through the lines 55 and 57 to the pressure-responsive element 41. These fast shock type pressure changes are eliminated by the hydro-pneumatic accumulator 60 which is teed into the pilot line at the T 56. The effect, then, of the accumulator 60 is to slightly slow down the action of the pressure-responsive element 41 and minimize the effects of minor high-speed disturbances without reducing the actual sensitivity of the member 41 nor its ability to cope with small changes of a relatively sustained type.

Figure 2:
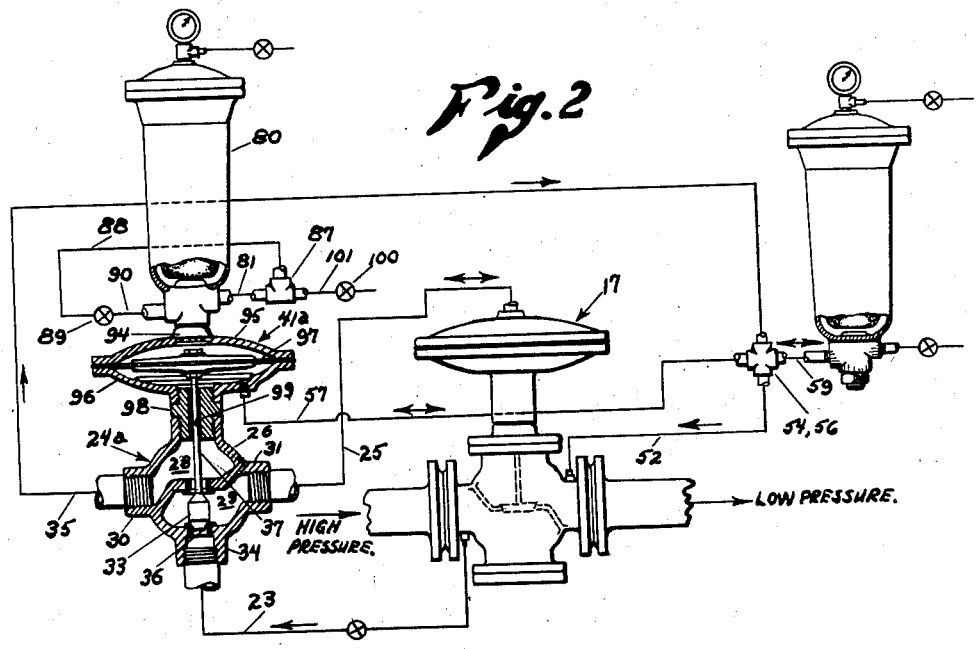
Fig. 2 is a schematic view similar to Fig. 1, but illustrating a modified form of the invention.

A modified form of the invention is illustrated in Figs. 2 and 3, wherein apparatus identical to that shown in Fig. 1 is identified by the same reference characters as are used in that figure. The apparatus shown in Figs. 2 and 3 differs from that illustrated and described with reference to Fig. 1 in the construction of the pilot valve and pressure-responsive elements identified in Fig. 2 by the reference characters 24a and 41a, respectively.

Strictly speaking, the pilot valve 24a is identical in operation with the pilot valve 24, the difference residing in an interchange of fluid connections, and the elimination of the valve stem packing. In Fig. 2, the power line 23 is connected to the lower boss 34 so as to communicate with the lower chamber 29 through the lower annular valve seat 36 instead of communicating with the upper chamber 28 as was the case with the arrangement shown in Fig. 1. In the same way, the drain line 35 is, in Fig. 2, connected to the boss 30 so as to communicate with the upper valve chamber 28. As in the form of the invention shown in Fig. 1, the line 25 extending to the pressure regulator motor element 17 is connected to the threaded boss 31 so as to communicate with the lower valve chamber 29.

The pressure-responsive element 41a of Fig. 2 differs from the corresponding device 41 shown in Fig. 1 by the substitution of a gas chamber 80 for the spring 47.

The gas chamber 80 comprises a tank or similar structure defining an enclosed interior space which is filled with air or other suitable gas. As is shown in Fig. 3, the interior of the chamber 80 is communicated with a tubing line 81 through the medium of passages 82, 83 and 84 formed in a boss portion 85 formed integrally with the chamber 80 and in a removable plug element indicated at 86 and suitably secured into a clean-out opening 87 formed in the boss 85. The boss 85 also provides means for attachment of the line 81.

The line 81 extends through a T 87 and by way of a line 88 to an orifice valve 89. The orifice valve 89 is connected by a line 90 to the boss 85 of the gas chamber 80, the boss 85 and plug member 86 providing passages 91 and 92 leading downwardly and out of the lower end of the plug member 86. The gas chamber 80 may, if desired, include a flexible partition for separating gas from liquid, arranged for example, as in the accumulator 60 of Fig. 1.

The lower end of the plug member 86 is threaded as shown at 94 to be received within a suitably threaded opening provided in an upper cover member 95 of the pressure-responsive element 41a. The upper cover member 95 cooperates with a lower housing portion 96 to secure and enclose a flexible diaphragm 97. The lower housing member 96 may be supported from the valve body 26 by means of a threaded connector 98 such as is shown in Fig. 2.

With the construction just described, the plug member 86 of the gas chamber 80 serves as a means for securing the gas chamber 80 to the body of the pressure-responsive element 41, while at the same time providing for a fluid interconnection between the chamber above the diaphragm 97 and the interior of the gas chamber 80, this fluid connection extending through the orificing valve 89.

The valve stem 37 of the pilot valve 24a is secured to the diaphragm 97 so that flexing of the diaphragm will correspondingly move the valve member 33. No packing is required around the valve stem 37, the same passing through a guiding bore 99 provided in the connector member 98. The guiding bore should be of a size selected to make a close but freely sliding fit with the valve stem 37 so that fluid may not flow through this bore into the chamber below the diaphragm 97 at a high rate. As will be pointed out hereinafter, a certain small flow through this passage provides additional negative feedback type of compensation, and it is therefore not necessary to provide an extremely close fit between the valve stem 37 and the walls of the bore 99. Also, the pressure differential tending to produce flow through this restricted passageway will not normally be more than a few pounds per square inch, and then only during periods of changing pressure.

The pilot line 57 is connected to the chamber beneath the diaphragm 97 so that increases in pressure in the pilot line 57 tend to lift the valve member 33 and close off the connection between the lower valve chamber 29 and the drain line 35, in the same way as increases in pressure in the pilot line 57 acting on the top of the diaphragm 44 of the apparatus shown in Fig. 1 tended to move the valve member 33 downwardly to close off the passageway connecting the lower valve chamber 29 with the drain line 35.

The gas chamber 80 performs the same function as the spring 47 by applying to the upper side of the diaphragm 97 a force tending to oppose the force exerted on the opposite side of the diaphragm by the pressure in the pilot line 57. A suitable inert gas or air is introduced under pressure into the gas chamber 80 after partially filling the same with water. The water filling is accomplished through an inlet valve 100 connected by a line 101 to the third leg of the T 87. With the valve 100 open, water under pressure is allowed to flow into the line 81 until the water in the chamber rises to a suitable level. Gas under pressure is then introduced through a gas charging valve 102 until a pressure of the desired magnitude, as indicated by a pressure gauge 103, is reached. Thus, the magnitude of the force applied to the upper side of the diaphragm 97 is adjusted by adjusting the pressure of the gas charge in the gas chamber 80. This adjustment corresponds in all respects to the adjustment of the force of the spring 47 through the use of the adjustment means 50 shown in Fig. 1.

The "gas spring" used in the apparatus illustrated in Fig. 2 has the advantage over the use of a mechanical spring in that there is substantially no inertia, and hysteresis losses due to the flexing of the spring and due to the friction forces in packing glands is substantially eliminated. A "gas spring" may also have an effective "length" much greater than is feasible with a mechanical spring, thus providing for improved regulation.

In a properly designed valve of this type, it is easily possible to achieve a sensitivity of one part in two hundred so that a full valve stroke is produced by a change of 0.5 pound per square inch at 100 pounds per square inch overage pressure.

The apparatus shown in Fig. 2 operates in substantially the same manner as does the control circuit described with reference to Fig. 1, as may be seen from the ensuing brief description. Let it be assumed that the mechanism is regulating at a given flow, and maintaining the desired downstream pressure in the secondary distribution system. Let it now be assumed that the demand on the secondary system is increased, with the result that the pressure in the pilot line portion 52 is caused to drop. This reduction in pressure, passed through the pilot line 57, causes the diaphragm 97 to move downwardly so as to partially close off the connection between the lower valve chamber 29 and the power line 23 while increasing the effective diameter of the communication between the pilot valve chambers 28 and 29. This causes a reduction in pressure in the chamber 29, which pressure is applied to the motor element 17 through the line 25 and causes the pressure regulating valve 10 to start opening to a greater extent.

At the same time, the flow in the drain line 35 is increased so as to increase the pressure at the T 54. This increase in pressure is passed through the pilot line portion 57 and applied to the underside of the diaphragm 97 so as to tend to oppose the downward movement of the diaphragm. This negative feedback is enhanced by a transmission of pressure from the valve chamber 28 through the clearance around the valve stem 37 into the chamber below the diaphragm 97.

It will be seen that the apparatus shown in Fig. 2, like that illustrated and described with reference to Fig. 1, provides a negative feedback, in an anticipatory fashion, of a compensating pressure on the pressure-responsive element 41 so as to readjust the pressure applied to the motor element 17 in such a way as to prevent overtraveling of the main regulating valve.

From the foregoing, it will be observed that this invention provides a new control circuit for use with pressure regulating valves which avoids many of the difficulties presently encountered in the use of conventional regulating systems. Attention is directed particularly to the construction of the pilot valves 24 and 24a providing for a variable flow of fluid in the drain line 35, and attention is also directed to the connection of the drain line 35 to the pilot line at a point approximately midway of the length thereof so as to provide the described anticipatory negative feedback action.

It is desired to emphasize at this time that the control circuit described herein effectively overcomes the deficiencies of the prior known pressure regulating systems in that it prevents overtraveling of the main valve and so eliminates or greatly minimizes the hunting of the valve and obviates the dangers of sustained oscillations being built up as a result of that hunting. It is desired to point out again that these advantageous results are secured through the use of the negative feedback type of circuit wherein a compensating pressure change is applied to the pressure-responsive element before the main valve has shifted its position enough to have produced such a pressure change. This causes the main valve to approach the desired final position in an asymptotic fashion, and the tendency of the valve to overshoot and hunt is completely avoided.

Attention is also directed to the use of the hydropneumatic accumulator 60 for smoothing out the pressure impulses which are applied to the pressure-responsive element 41.

Finally, attention is directed to the use of the gas chamber 80 as a spring for determining the pressure response characteristic of the pressure-responsive element 41a. In this connection, it will be seen that the throttling valve 89 serves as a damping element and may be adjusted to prevent the establishment of harmonic oscillations resulting from an interchange of fluid between the gas chamber 80 and the chamber above the diaphragm 97. As a damping means, the valve 89 exhibits the same characteristics as mechanical damping of an elastic system, without, however, introducing the undesirable elements of static friction and high inertia.

While the preferred embodiment of this invention has been illustrated and described herein, the same is not to be limited to the details of construction shown and described, except as defined in the appended claims.

I claim:

1. In a control system for use with a pressure regulating valve connected between a high pressure line and a low pressure line and having a motor element for adjusting said regulating valve, the combination of: a pilot valve; a pressure responsive element for operating said pilot valve; a pilot line connecting said pressure responsive element to said low pressure line; a power line connecting said pilot valve to said high pressure line; a control line connecting said pilot valve to said motor element; a drain line connected to said pilot valve, said pilot valve being operable in one limiting position to connect said control line to said power line and operable in the other limiting position to connect said control line to said drain line, said power line, control line, and drain line being interconnected in intermediate positions of said valve, said drain line being restricted, whereby the change in pressure in the upstream portion of said drain line resulting from operation of said pilot valve is in a direction opposite to the change in pressure in said control line; and means for applying the pressure change in the upstream portion of said drain line to said pressure responsive element.

2. In a control system for use with a pressure regulating valve connected between a high pressure line and a low pressure line and having a motor element for adjusting said regulating valve, the combination of: a pilot valve; a pressure responsive element for operating said pilot valve; a pilot line connecting said pressure responsive element to said low pressure line; a power line connecting said pilot valve to said high pressure line; a control line connecting said pilot valve to said motor element; and a drain line connected at one end to said pilot valve and connected at the other end to said pilot line at a point intermediate the ends thereof, said pilot valve being operable in one limiting position to connect said control line to said power line and in the other limiting position to connect said control line to said drain line, said power line, control line, and drain line being interconnected in intermediate positions of said valve, said drain line and said pilot line being restricted, whereby the change in pressure in said pilot line at said intermediate point resulting from operation of said pilot valve is in a direction opposite to the change in pressure in said control line.

3. In a control system for use with a pressure regulating valve connected between a high pressure line and a low pressure line and having a motor element for adjusting said regulating valve, the combination of: a pilot valve; a pressure responsive element for operating said pilot valve; a pilot line connecting said pressure responsive element to said low pressure line, said pilot valve defining a valve chamber having an inlet port and an outlet port communicating therewith and including a reciprocal valve member movable between limiting positions closing one or the other of said ports; a power line connecting said inlet port to said high pressure line; a control line connecting said chamber to said motor element; and a drain line connected at one end to said outlet port and connected at the other end to said pilot line at a point intermediate the ends thereof, the portion of said pilot line between said intermediate point and said low pressure line being restricted to produce a pressure drop in said portion, whereby there is applied to said pressure responsive element as a result of operation of said pilot valve a pressure change opposing the pressure change causing operation of said pilot valve.

4. In a control system for use with a pressure regulating valve connected between a high pressure line and a low pressure line and having a motor element for adjusting said regulating valve, the combination of: a pilot valve; a pressure responsive element for operating said pilot valve; a pilot line connecting said pressure responsive element to said low pressure line; a power line connecting said pilot valve to said high pressure line; a control line connecting said pilot valve to said motor element; a drain line connected at one end to said pilot valve and connected at the other end to said pilot line at a point intermediate the ends thereof, said pilot valve being operable in one limiting position to connect said control line to said power line and in the other limiting position to connect said control line to said drain line, said power line, control line, and drain line being interconnected in intermediate positions of said valve, said drain line and said pilot line being restricted, whereby the change in pressure in said pilot line at said intermediate point resulting from operation of said pilot valve is in a direction opposite to the change in pressure in said control line; and a hydro-pneumatic accumulator connected to said pilot line.

5. In a control system for use with a pressure regulating valve connected between a high pressure line and a low pressure line and having a motor element for adjusting said regulating valve, the combination of: a pilot valve; a pressure responsive element for operating said pilot valve; a pilot line connecting said pressure responsive element to said low pressure line; a power line connecting said pilot valve to said high pressure line; a control line connecting said pilot valve to said motor element; a drain line connected at one end to said pilot valve and connected at the other end to said pilot line at a point intermediate the ends thereof, said pilot valve being operable in one limiting position to connect said control line to said power line and in the other limiting position to connect said control line to said drain line, said power line, control line, and drain line being interconnected in intermediate positions of said valve, said drain line and said pilot line being restricted, whereby the change in pressure in said pilot line at said intermediate point resulting from operation of said pilot valve is in a direction opposite to the change in pressure in said control line; and a manually operable throttling valve in said power line.

6. In a control system for use with a pressure regulating valve connected between a high pressure line and a low pressure line and having a motor element for adjusting said regulating valve, the combination of: a pilot valve; a pressure responsive element for operating said pilot valve; a pilot line connecting said pressure responsive element to said low pressure line, said pilot valve defining a valve chamber having an inlet port and an outlet port communicating therewith and including a reciprocal valve member movable between limiting positions closing one or the other of said ports; a power line connecting said inlet port to said high pressure line; a control line connecting said chamber to said motor element; a drain line connected at one end to said outlet port and connected at the other end to said pilot line at a point intermediate the ends thereof, the portion of said pilot line between said intermediate point and said low pressure line being restricted to produce a pressure drop in said portion, whereby there is applied to said pressure responsive element as a result of operation of said pilot valve a pressure change opposing the pressure change causing operation of said pilot valve; and a hydro-pneumatic accumulator connected to said pilot line.

7. A hydraulic feedback adapted to correct the movements of a motor operated main valve controlling the rate of flow and the pressure of the fluid in a pipe system, which includes: a main valve designed to vary the flow rate and the pressure in the pipe system; a fluid motor operating said main valve; a pilot valve responsive to pressure variations in said pipe system; a fluid motor operating said pilot valve, said pilot being comprised of a central chamber, two ports in said chamber, and a valve moveable in said chamber between said two ports by said pilot, fluid motor to vary the relative opening of said ports and to close one port at the extreme limit of travel in one direction; a source of fluid pressure from said pipe system, a second source of fluid of lower pressure from another portion of said pipe system, whereby a pressure differential between said first and said second pressure sources may be developed; and piping between said valves and said piping system, comprising a control line from said pilot chamber to said fluid motor of said main valve, a pilot valve operating line from said low pressure source to said pilot motor, a power line from said high pressure source to one of said ports in said pilot chamber, and a feedback line from the other of said pilot ports in said pilot chamber to carry pressure from said pilot chamber to said pilot motor.

References Cited in the file of this patent

UNITED STATES PATENTS

| | | |
|---|---|---|
| 1,162,383 | Neal | Nov. 30, 1915 |
| 1,626,073 | Brody | Apr. 26, 1927 |
| 1,718,673 | Wettstein | June 25, 1929 |
| 1,769,612 | Wettstein | July 1, 1930 |
| 1,800,352 | Klees | Apr. 19, 1931 |
| 1,918,891 | Barrett | July 18, 1933 |
| 1,923,788 | Mastenbrook | Aug. 22, 1933 |
| 2,039,099 | Mastenbrook | Apr. 28, 1936 |
| 2,098,914 | Gorrie | Nov. 9, 1937 |
| 2,257,171 | King | Sept. 30, 1941 |